United States Patent [19]

Kirschner

[11] 4,453,240
[45] Jun. 5, 1984

[54] VIDEO DISC PLAYER HAVING CADDY OVERTRAVEL MECHANISM

[75] Inventor: Thomas F. Kirschner, Indianapolis, Ind.

[73] Assignee: RCA Corporation, New York, N.Y.

[21] Appl. No.: 536,091

[22] Filed: Sep. 27, 1983

[51] Int. Cl.³ .................. G11B 17/04; G11B 25/04; G11B 5/82

[52] U.S. Cl. .................. 369/77.2; 369/258; 369/262; 360/133

[58] Field of Search ............. 369/77.2, 258, 262; 360/133; 206/309

[56] References Cited

U.S. PATENT DOCUMENTS

| | | | |
|---|---|---|---|
| 4,239,238 | 12/1980 | Coleman | 369/77.2 |
| 4,266,784 | 5/1981 | Torrington | 369/77.2 |
| 4,272,083 | 6/1981 | Torrington | 369/262 |

FOREIGN PATENT DOCUMENTS

| | | | |
|---|---|---|---|
| 55-89960 | 7/1980 | Japan | 369/77.2 |
| 186260 | 11/1982 | Japan | 369/77.2 |
| 2087127 | 5/1982 | United Kingdom | 369/77.2 |
| 2098380A | 5/1982 | United Kingdom | |

OTHER PUBLICATIONS

U.S. Application of R. W. Jebens entitled "Video Disc Player Having Improved Caddy Extraction Mechanism".

Primary Examiner—Charles Frankfort
Assistant Examiner—Thomas P. Matecki
Attorney, Agent, or Firm—E. M. Whitacre; W. H. Meise; D. A. Kulkarni

[57] ABSTRACT

The player is provided with a pair of spaced apart spine latching members which hook up with an inner record retaining spine as a caddy is inserted into the player so that when the outer jacket is withdrawn, the record/spine assembly is retained inside the player. A caddy overtravel mechanism prevents a selected one of the latching members from latching up the spine until the other latching member is also in position to capture the spine. A rigid coupling member interconnecting the latching members precludes the other latching member from capturing the spine until both latching members are ready to latch up the spine to assure simultaneous latching of the spine.

5 Claims, 12 Drawing Figures

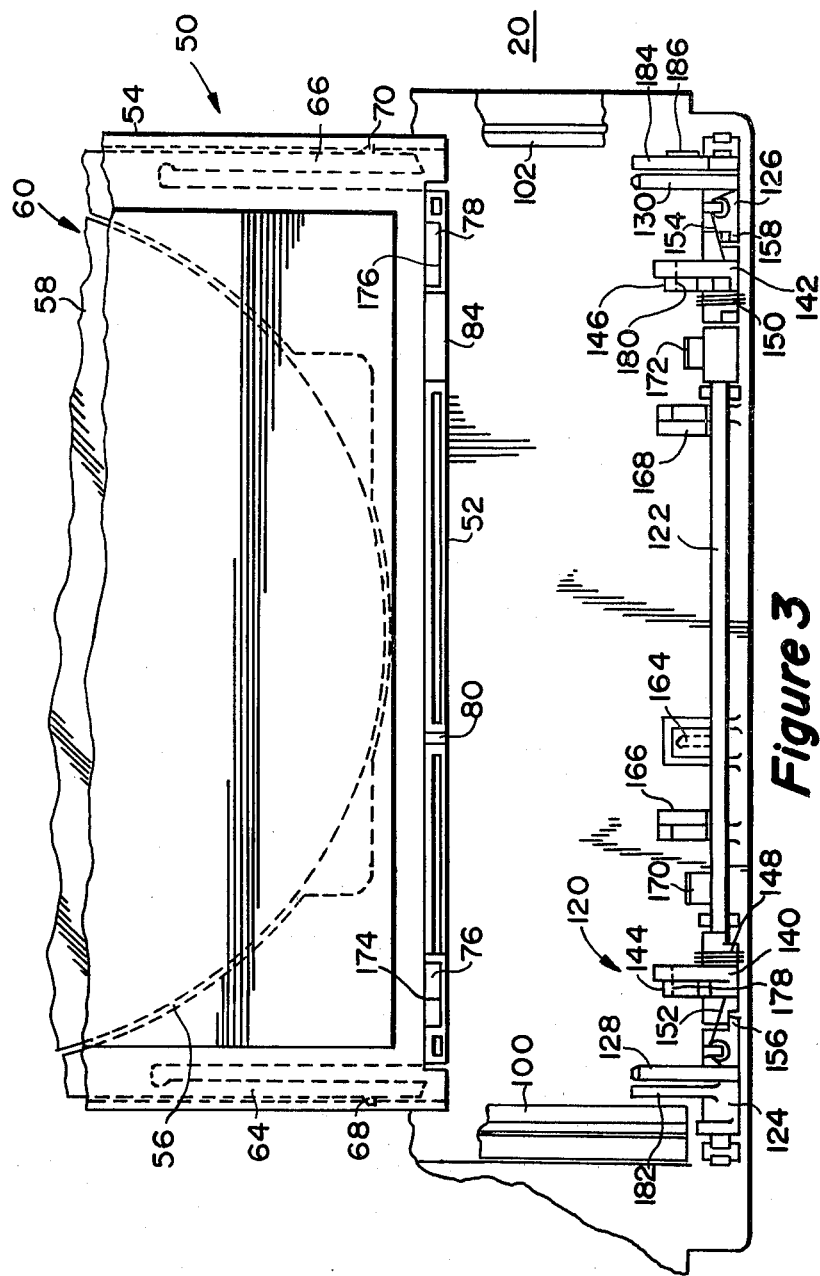

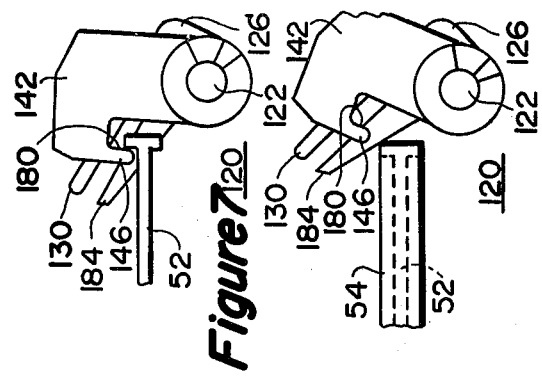
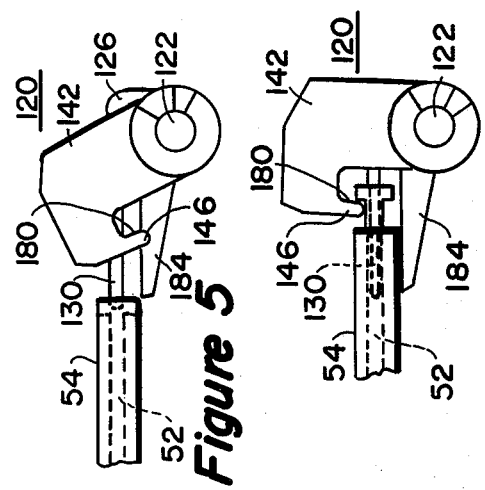
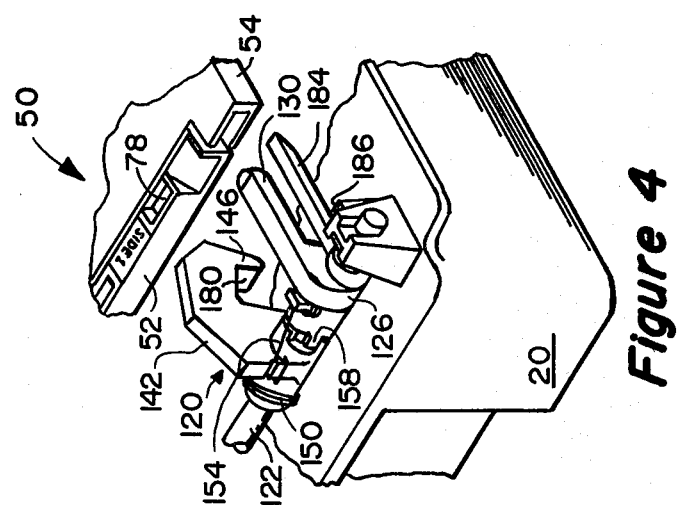

VIDEO DISC PLAYER HAVING CADDY OVERTRAVEL MECHANISM

This invention relates to a record playback system, and more particularly, it relates to a mechanism for loading a record into a record player and removing it therefrom while the record remains enclosed in its caddy.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises an inner record retaining spine removably located within an outer jacket or sleeve. The record retaining spine has an opening in which a record is received to form a record/spine assembly. The record retaining spine is provided with a pair of spaced apart locking fingers disposed at the opposite edges thereof to releasably secure the spine to the sleeve. For record loading, a full caddy is inserted into an input slot provided in the player along a path defined by a pair of caddy guide rails. A record extraction mechanism disposed in the player removes the record/spine assembly from the sleeve when the sleeve is withdrawn to leave the assembly inside the player resting on a set of record receiving pads. The retained record is then transferred to the turntable for playback. For record retrieval, the record is transferred back to the receiving pads, and an empty jacket is reinserted into the player to recapture the record/spine assembly. U.S. Pat. Nos. 4,239,108 and 4,226,424, respectively, illustrate a video disc caddy and a record extraction mechanism suitable for use therewith.

The record extraction mechanism in U.S. Pat. No. 4,226,424 comprises a pair of pivotally-mounted spaced apart pry bars which protrude into the sleeve and deflect the spine locking fingers to release the spine from the sleeve as a caddy is inserted into the player. Simultaneously, a pair of pivotally-mounted spaced apart hooks enter into the respective slots provided in the spine to lock it to the player, so that when the sleeve is removed, the enclosed record/spine assembly is held inside the player. A pair of springs bias the spine latching hooks into latching engagement with the spine. A second pair of springs connect the pry bars and the spine latching hooks together to cause the pry bars to follow the deflected hooks when the sleeve is withdrawn. When an empty sleeve is reinserted into the player to recapture the record/spine assembly, it drives the displaced pry bars against the spine latching hooks to force them away from the spine to free the caddy. The caddy is then extracted from the player.

In Kirschner's U.S. patent application, Ser. No. 374,378, a modified caddy extraction mechanism is disclosed. In the therein disclosed mechanism, both the pry bars and the spine latching hooks are pivotally mounted on a single cross shaft located at the back end of the player. When a caddy is inserted into the player, the spine is released from its sleeve by the pry bars and secured to the player by the spine latching hooks, so that the record/spine assembly is maintained inside the player when the sleeve is extracted. The springs connecting the pry bars and the spine latching hooks together cause the pry bars to rise up as the sleeve is withdrawn. An empty sleeve, reinserted into the player to retrieve the record/spine assembly, forces the raised pry bars against the spine latching hooks to lift them away from the spine to release the caddy. The caddy is then removed.

In record extraction mechanisms of the above type, a failure mode exists. It is possible that only one side of the spine may latch up if the caddy is not sufficiently driven in or is cocked when inserted, thereby leaving a misaligned record/spine assembly in the player upon jacket withdrawal. The misaligned record/spine assembly has the potential of causing damage to the disc and the player components during the transfer of the record to the turntable.

In accordance with this invention, a lever is slidably mounted in the player for cooperation with, but independent of, a selected one of the spine latching members for motion between a retracted position and an advanced position. The slidably-mounted lever has an abutment portion disposed in the caddy insertion path for engagement with the caddy during insertion thereof into the player for motion therewith toward its advanced position. The reciprocably-mounted lever has a further portion which is interposed between the selected latching member and the spine during the caddy insertion to preclude the selected latching member from capturing the spine until the other spine latching member is also ready to capture the spine. The two spine latching members are rigidly connected together to prevent the other latching member from capturing the spine until both latching members are in position to capture the spine to assure simultaneous latching of the spine to the player.

Figures 1, 2:
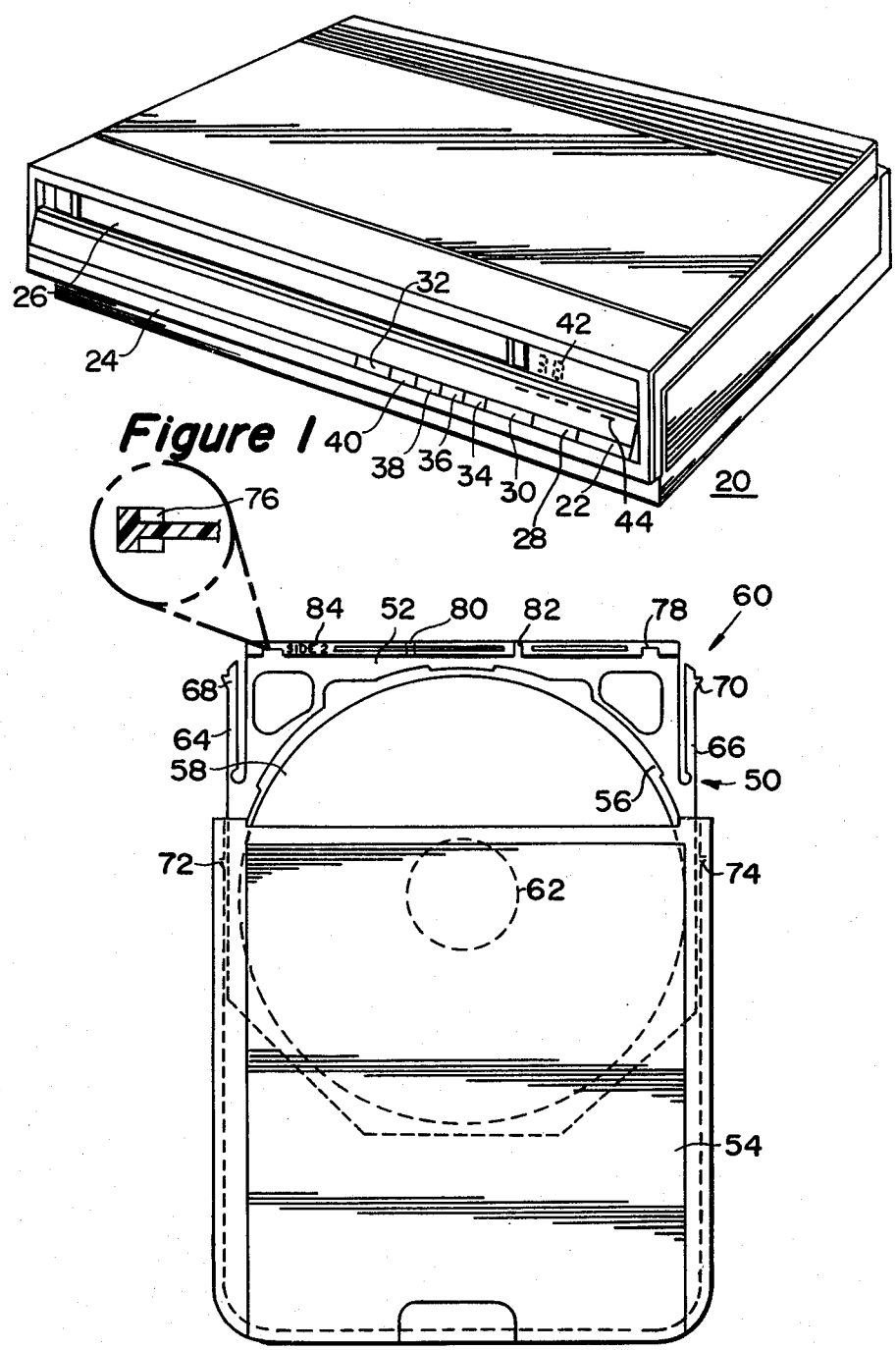
FIG. 1 shows a video disc player having a caddy extraction mechanism.
FIG. 2 illustrates a video disc caddy suitable for use with the video disc player of FIG. 1.
Figure 10:
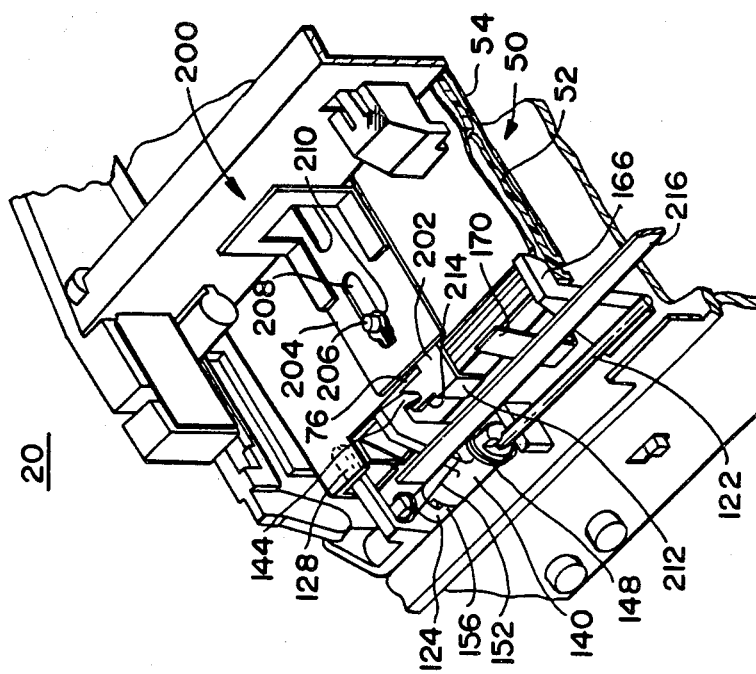
Figure 9:
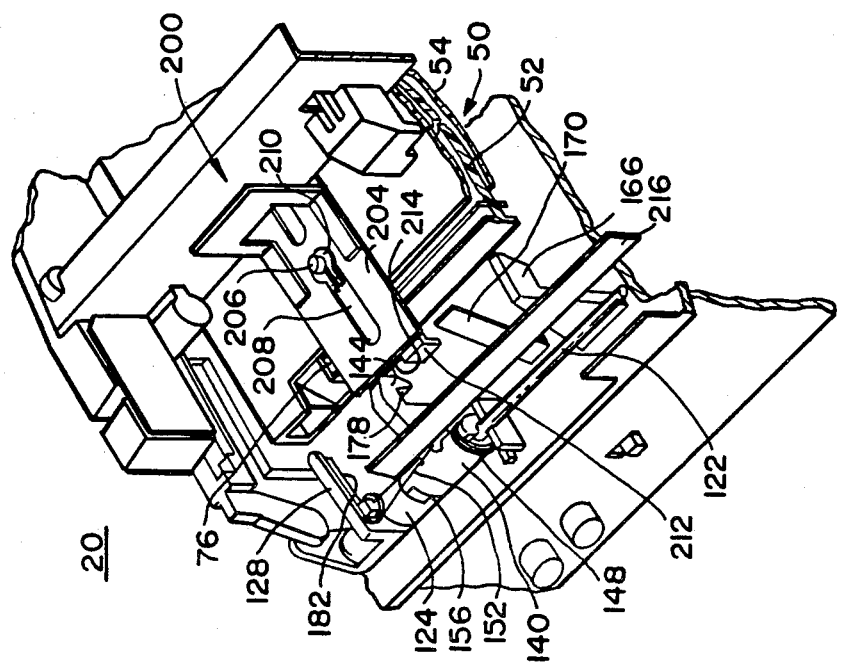
Figure 12:
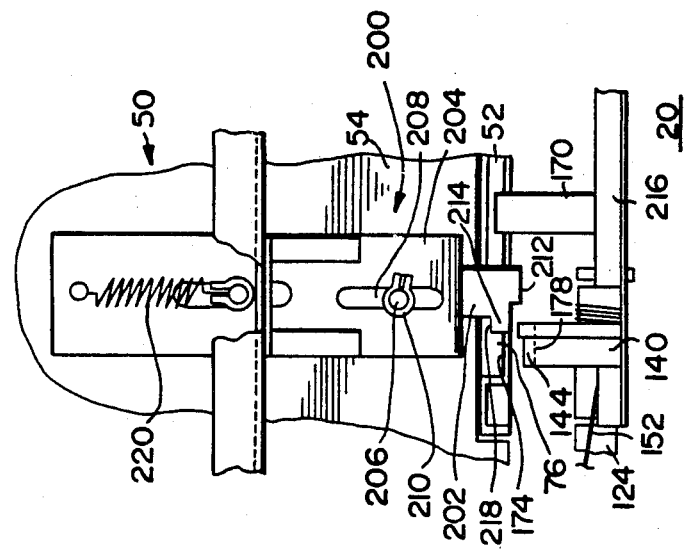
Figure 11:
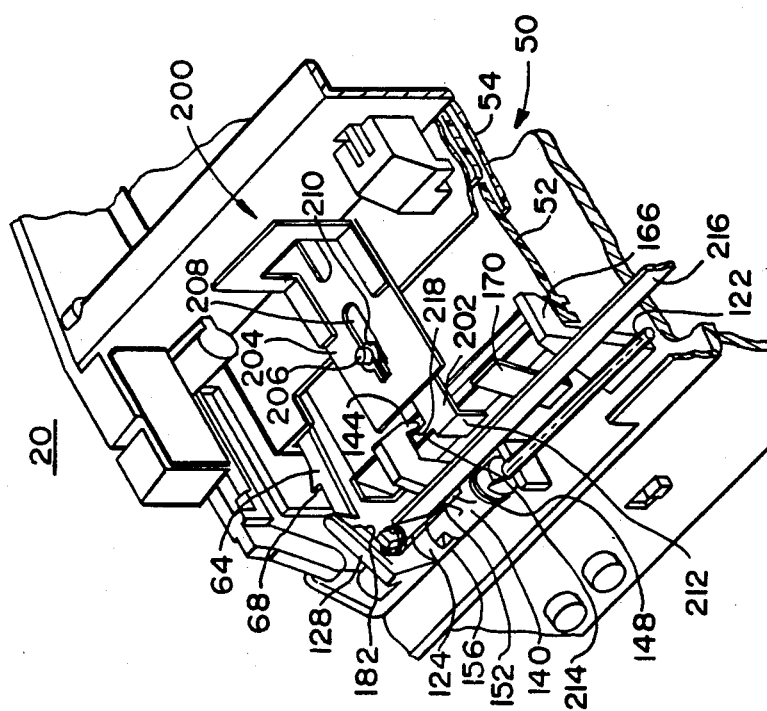

FIGS. 3 and 4 respectively depict a partial plan view and a perspective view of the caddy extraction mechanism used in the FIG. 1 video disc player;

FIGS. 5–8 indicate the operating sequence of the caddy extraction mechanism of FIGS. 3 and 4;

FIGS. 9–11 illustrate the construction and operation of the caddy overtravel mechanism in accordance with this invention; and FIG. 12 is a plan view of the latch overtravel mechanism of FIGS. 9–11.

Shown in FIG. 1 is a video disc player 20. To play a disc, the player is turned on by pressing the "POWER" button 22 located on the front panel 24. A loaded record caddy, illustrated in FIG. 2, is inserted into the player through a caddy input slot 26, and the caddy sleeve is then extracted leaving the enclosed record/spine assembly inside the player. The record is automatically deposited on the turntable, and played back through a conventional television receiver. At any point during playback, the viewer can reject the remainder of the record by depressing the "REJECT" button 28, or interrupt the program by activating the "PLAY/PAUSE" button 30. The player has a "CHANNEL SELECT" button 32 to select any one of two audio channels in the event of a bilingual program disc. Buttons 34, 36, 38 and 40 permit the user to visually search the record in either direction at two different speeds (e.g., 16 and 120 times the normal playback speed). An LED indicator 42 shows the elapsed playing time. Various player functions—such as SIDE 1-2, CHANNEL A-B, STEREO—are indicated by a plurality of light indicators 44.

The FIG. 2 caddy 50 consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably securing the spine 52 in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the player record extraction mechanism are selectively received to secure the spine to the player. The front edge of the spine 52 has slots 80 and 82 in which a side-to-side locating member of the player is received upon caddy insertion to accurately locate the record/spine assembly 60 in the player. The spine 52 is further provided with record side identifying indicia 84.

To load a record, the caddy 50 is manually inserted into the player through the input slot 26. The player has a set of guide rails 100 and 102, depicted in FIG. 3, for guiding the caddy insertion along a path. The player is further provided with a record extraction mechanism 120, shown in FIGS. 3 and 4, to extract the enclosed record/spine assembly from the caddy for retention in the player and to return the retained assembly back to the caddy after playback without the need for touching the record. The record extraction mechanism 120 comprises a cross shaft 122 pivotally mounted near the back end of the player at right angles to the caddy insertion path. Disposed at the opposite ends of the offset shaft 122, and fixedly secured thereto, are a pair of spine releasing members 124 and 126. The spine releasing members 124 and 126 are each equipped with respective wedge-like portions 128 and 130 arranged in the caddy insertion path. When the caddy 50 is inserted into the player, the wedge-like portions 128 and 130 protrude into the sleeve 54 to deflect the spine locking fingers 64 and 66 in order to release the spine 52 from the sleeve in the manner depicted in FIGS. 5 and 6.

The record extraction mechanism 120 further includes a pair of spine latching members 140 and 142 mounted freely on the cross shaft 122 adjacent to the respective spine releasing members 124 and 126. When the caddy 50 is inserted into the player, it rotates back the hook-like portions 144 and 146 of the spine latching members 140 and 142 as indicated in FIGS. 5 and 6. A pair of coil springs 148 and 150 drive the hook-like portions 144 and 146 into the slots 76 and 78 in the spine 52 to lock the spine to the player as shown in FIG. 6. The sleeve 54 is then manually extracted, leaving the record/spine assembly 60 inside the player resting on a set of record receiving pads (not shown). When the sleeve 54 is withdrawn, a pair of springs 152 and 154, connecting the spine releasing members 124 and 126 and the spine latching members 140 and 142 together, cause the spine releasing members to follow the spine latching members until the tabs 156 and 158 disposed on the spine releasing members reengage the respective walls of the spine latching members in the manner indicated in FIG. 7.

A side-to-side locating member 164 is driven into the slot 80 disposed in the spine 52 as the caddy 50 arrives at its fully inserted position in the player to assure accurate lateral registration of the spine in the player. The player is further fitted with a pair of slotted brackets 166 and 168 which serve to ensure accurate vertical alignment of the spine 52. Disposed in the player are a pair of stiff leaf springs 170 and 172 which bias the spine 52 so that the perpendicularly disposed walls 174 and 176 of the respective cutouts 76 and 78 in the spine are firmly in engagement with the perpendicularly disposed edges 178 and 180 of the corresponding hook-like portions 144 and 146 of the spine latching members 140 and 142 to provide accurate front-to-back alignment of the spine.

A record handling mechanism (not illustrated) is activated to transfer the retained record 58 from the receiving pads to a turntable, and the turntable motor is turned on. A stylus arm carriage is driven by a motor to a position over the turntable, and the stylus is lowered onto the record 58. During playback, the carriage motor drives the carriage to follow the pickup stylus. At the end of the playback, the carriage motor returns the carriage to its starting position. The record 58 is then returned to the receiving pads by the record handling mechanism to redefine the record/spine assembly 60.

To recapture the record/spine assembly 60 disposed on the receiving pads, the empty sleeve 54 is reinserted into the player. As the caddy sleeve 54 reaches the fully inserted position in the player, its front edge engages and further lifts up the cantilever portions 182 and 184 of the spine releasing members 124 and 126. When the spine releasing members 124 and 126 are raised by the sleeve 54, the tabs 156 and 158, in turn, press against the respective spine latching members 140 and 142 to push the hook-like portions 144 and 146 out of the slots 76 and 78 in the spine 52 to release the spine as shown in FIG. 8. When the spine 52 is thus released, the stiff leaf springs 170 and 172 force the spine into the jacket 54 to snap the spine to the jacket. The caddy 50 is then manually removed from the player. The springs 148 and 150 rotate the spine latching members 140 and 142 and, in turn, the spine releasing members 124 and 126 downward until the spine releasing member 126 is against a stop 186 provided in the player housing, thereby resetting the caddy extraction mechanism for the next cycle.

As previously indicated, it is possible to hook up one side of the spine 52 if the caddy 50 is insufficiently inserted into the player or if the caddy is cocked when it is pushed into the player. This problem results in a mislocated record/spine assembly 60, which can cause damage, for example, to the stylus or the disc during record transfer operation. To this end, a caddy overtravel mechanism 200, illustrated in FIGS. 9–12, is provided in accordance with the principles of the present invention to ensure that both sides of the spine 52 latch up in the player simultaneously.

The caddy overtravel mechanism 200 comprises a lever 202 reciprocably mounted in the player on a bracket 204 for cooperation with, but independent of, the spine latching member 140 for motion between a retracted position shown in FIG. 9 and an advanced position 11. To this end, a pin 206, fixedly secured to the lever 202, is passed through an elongated slot 208 in the bracket 204 and held in place by a retaining washer 210. The slidable lever 202 is provided with an abutment portion 212 which is disposed in the caddy insertion path substantially at right angles to it for engagement with the leading edge of the caddy 50 during insertion thereof into the player for motion therewith toward the advanced position.

Further disposed on the overtravel lever 202 is a further portion 214 which is interposed between the hook portion 144 of the selected spine latching member 140 and the slot 76 in the spine 52, in the manner indicated in FIG. 10, as the caddy 50 approaches its fully inserted position in the player. The interposition of the offset further portion 214 between the spine 52 and the selected latching member 140 prevents the hook portion 144 from dropping into the slot 76 to capture the record/spine assembly 60.

A member 216, rigidly connecting the spine latching members 140 and 142 together, prevents the latching member 142 from hooking up the spine 52 until both latching members are in position to capture the spine. Further insertion of the caddy 50 into the player beyond the normal latch up point, indicated in FIG. 10, to a point where the perpendicularly disposed edge 178 of the hook portion 144 clears the back cliff 218 of the offset portion 214, indicated in FIG. 11, causes the spine latching hooks 144 and 146 to fall into the respective cutouts 76 and 78 of the spine 52, thereby locking the spine to the player.

As the jacket 54 is withdrawn, in the manner illustrated in FIG. 11, the stiff leaf springs 170 and 172 drive the spine 52 out until the perpendicularly disposed edges 174 and 176 of the cutouts 76 and 78 in the spine are pressed against the corresponding edges 178 and 180 of the hook portions 144 and 146 of the latching members 140 and 142 to assure accurate front-to-back alignment.

The spacing between the perpendicularly disposed edge 178 of the hook portion 144 and the back edge 218 of the further portion 214 when the caddy 50 has arrived at the normal latch up point, shown in FIG. 10, exceeds any tolerance buildup to assure simultaneous latch up of both sides of the spine 52 when the caddy is fully inserted into the player to prevent possible damage to the disc due to misalignment. The normal latch up point is defined as the point along the caddy insertion path where the hooks 144 and 146 would have normally captured the spine 52 to lock it to the player in the absence of the caddy overtravel mechanism 200. Alternatively, the normal latch up point can be defined as the point where the perpendicularly disposed edges 174 and 176 of the cutouts 76 and 78 in the spine 52 are aligned with the corresponding edges 178 and 180 of the hooks 144 and 146 of the respective latch members 140 and 142.

After the jacket 54 is withdrawn from the player, the retained record 58 is transferred to the player turntable for playback. Upon playback, the record 58 is returned to the receiver pads to redefine the record/spine assembly 60. To retrieve the record/spine assembly 60, an empty jacket 54 is reinserted into the player as previously indicated. The front edge of the empty jacket 54 engages the cantilever portions 182 and 184 of the spine releasing members 124 and 126 to lift up the releasing members as well as the spine latching members 140 and 142 to release both the spine 52 and the overtravel lever 202. When the spine 52 is thus released, the stiff leaf springs 170 and 172 drive the spine into the jacket 54 to cause the spine locking fingers 64 and 66 to secure the spine to the jacket. The caddy 50 can then be removed.

A coil spring 220, having its ends respectively secured to the bracket 204 and the slidable lever 202, cause the slidable lever to return to its retracted position in the manner indicated in FIG. 12.

The caddy overtravel mechanism 200 of the subject invention effectively eliminates a potential failure mode caused by non-simultaneous latching of the spine.

What is claimed is:

1. In a disc record player for use with a record caddy consisting of an outer jacket and an inner record retaining spine; said player having a record extraction mechanism including a pair of spaced apart spine latching members for capturing said spine during insertion of said caddy into said player along a path so that said spine and an associated record remain inside said player when said jacket is withdrawn; improvement comprising:

(A) a lever slidably mounted in said player for cooperation with, but independent of, one of said spine latching members for motion between a retracted position and an advanced position; said slidably mounted lever having an abutment portion disposed in said caddy insertion path for engagement with said caddy during insertion thereof into said player for motion therewith toward said advanced position; said slidably mounted lever having a further portion which is interposed between said one spine latching member and said spine during said caddy insertion to preclude said one spine latching member from capturing said spine until the other of said spine latching members is also ready to capture said spine; and (B) a member rigidly coupling said spine latching members together to prevent the other latching member from capturing said spine until both spine latching members are in position to capture said spine to assure simultaneous latching of said spine to said player.

2. The video disc player of claim 1 further including means for biasing said slidably-mounted lever toward said retracted position thereof.

3. The disc record player as defined in claim 1 wherein said further portion is provided with a back edge; wherein said further portion interposed between said spine and said one spine latching member prevents said one spine latching member from capturing said spine until said caddy is inserted into said player beyond the normal latch up point toward a point where said one spine latching member clears said back edge of said further portion.

4. The disc record player of claim 3 wherein the distance between said normal latch up point and said back edge of said further portion is sufficient to assure simultaneous latch up of said spine by said spine latching members.

5. The disc record player as set forth in claim 1 further including a bracket fixedly mounted to said player; wherein said slidably mounted lever is reciprocably mounted on said bracket for motion along a path substantially parallel to said caddy insertion path; wherein said abutment portion is disposed in said caddy insertion path substantially at right angles to it such that the leading edge of said caddy engages said abutment during said caddy insertion to drive it to said advanced position thereof.

* * * * *